(12) United States Patent
Sinaguinan

(10) Patent No.: US 9,640,066 B2
(45) Date of Patent: May 2, 2017

(54) SYSTEM AND METHOD FOR LIMITING REMOTE CONTROL BETWEEN A PORTABLE ELECTRONIC DEVICE AND ONE OR MORE VEHICLE SYSTEMS

(71) Applicant: Honda Motor Co., Ltd., Tokyo (JP)

(72) Inventor: Justin E. Sinaguinan, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/859,403

(22) Filed: Sep. 21, 2015

(65) Prior Publication Data

US 2017/0084169 A1 Mar. 23, 2017

(51) Int. Cl.

| G06F 17/00 | (2006.01) |
|---|---|
| G06F 15/16 | (2006.01) |
| G08C 17/02 | (2006.01) |
| H04M 1/60 | (2006.01) |
| G01C 21/34 | (2006.01) |
| H04M 1/725 | (2006.01) |

(52) U.S. Cl.
CPC ........ *G08C 17/02* (2013.01); *H04M 1/72569* (2013.01); *H04M 1/72577* (2013.01); *G08C 2201/93* (2013.01)

(58) Field of Classification Search
CPC . G06F 17/00; G06F 15/16; G06F 1/00; G08C 17/02; H04M 1/6075
USPC ..... 340/12.5; 701/2, 206; 713/310, 300, 203
See application file for complete search history.

(56) References Cited

U.S. PATENT DOCUMENTS

| 5,959,540 | A  * | 9/1999 | Walter ............... B60R 25/2018 |
|---|---|---|---|
| | | | 180/287 |
| 6,341,101 | B1 * | 1/2002 | Dutton .................... G01S 7/537 |
| | | | 367/1 |
| 7,873,847 | B2 * | 1/2011 | Bozek ................... G06F 1/3209 |
| | | | 709/203 |
| 8,050,817 | B2 | 11/2011 | Moinzadeh et al. |
| 8,787,949 | B2 * | 7/2014 | Sumcad .................. H04W 4/12 |
| | | | 455/412.2 |
| 8,831,824 | B2 | 9/2014 | Moinzadeh et al. |
| 8,838,332 | B2 | 9/2014 | Moinzadeh et al. |
| 9,106,309 | B2 * | 8/2015 | Ozaki ................. H04M 1/6091 |
| 9,224,289 | B2 * | 12/2015 | Demeniuk ............. G08C 17/02 |
| 2007/0124043 | A1 * | 5/2007 | Ayoub .................... G06F 21/10 |
| | | | 701/36 |

(Continued)

*Primary Examiner* — Nam V Nguyen
(74) *Attorney, Agent, or Firm* — Rankin, Hill & Clark LLP

(57) ABSTRACT

A method and system for limiting remote control between a portable electronic device and one or more vehicle systems in a vehicle. The method and system include connecting the portable electronic device to the vehicle. The method and system also include sending one or more remote control commands from the portable electronic device to the one or more vehicle systems, the one or more remote control commands are executed for remotely controlling the one or more vehicle systems from the portable electronic device. Additionally, the method and system include determining one or more countermeasure controls associated with the one or more remote control commands. The method and system further include restricting the execution of one or more remote control commands from the portable electronic device if it determined that one or more countermeasure controls are associated with the one or more remote control commands.

20 Claims, 5 Drawing Sheets

(56) References Cited

U.S. PATENT DOCUMENTS

| | | | |
|---|---|---|---|
| 2007/0124046 A1* | 5/2007 | Ayoub | G06F 21/10 |
| | | | 701/36 |
| 2010/0210317 A1* | 8/2010 | Kakehi | H04M 1/6091 |
| | | | 455/569.2 |
| 2011/0295444 A1* | 12/2011 | Westra | G06F 21/554 |
| | | | 701/1 |
| 2012/0065815 A1 | 3/2012 | Hess | |
| 2013/0030645 A1 | 1/2013 | Divine et al. | |
| 2013/0238165 A1 | 9/2013 | Garrett et al. | |
| 2013/0274997 A1 | 10/2013 | Chien | |
| 2014/0005859 A1 | 1/2014 | Baskin et al. | |
| 2014/0074318 A1 | 3/2014 | Lim | |
| 2014/0088793 A1 | 3/2014 | Morgan et al. | |
| 2014/0096180 A1 | 4/2014 | Negi et al. | |
| 2014/0142783 A1 | 5/2014 | Grimm et al. | |
| 2014/0163771 A1 | 6/2014 | Demeniuk | |
| 2014/0163774 A1 | 6/2014 | Demeniuk | |
| 2014/0164559 A1 | 6/2014 | Demeniuk | |
| 2014/0229035 A1 | 8/2014 | Rector et al. | |
| 2014/0249714 A1 | 9/2014 | Gormley | |

* cited by examiner

SYSTEM AND METHOD FOR LIMITING REMOTE CONTROL BETWEEN A PORTABLE ELECTRONIC DEVICE AND ONE OR MORE VEHICLE SYSTEMS

BACKGROUND

Vehicle systems have recently evolved to become more useful to all of the occupants within a vehicle rather than just a driver. These systems have been designed to ensure that passengers can interact with the vehicle systems without any driver interaction. In some cases due to the amount of control that passengers can execute over the vehicle systems, passengers can mishandle the use of controls by modifying vehicle system settings that are not in accordance with the driver's preferences. This misuse of the controls by passengers can increase the possibility of driver distraction as the driver attempts to change the settings back to his/her preferences and/or prevents the passenger from mishandling the use of controls. Such unnecessary distraction can increase the probability of visual, manual, and cognitive distraction from driving that can compromise the safety of the occupants of the vehicle or other vehicles on the road.

SUMMARY

According to one aspect, a method for limiting remote control between a portable electronic device and one or more vehicle systems in a vehicle is provided. The method includes connecting the portable electronic device to the vehicle. The method also includes sending one or more remote control commands from the portable electronic device to the one or more vehicle systems, the one or more remote control commands are executed for remotely controlling the one or more vehicle systems from the portable electronic device. Additionally, the method includes determining one or more countermeasure controls associated with the one or more remote control commands. The method further includes restricting the execution of one or more remote control commands from the portable electronic device if it determined that one or more countermeasure controls are associated with the one or more remote control commands.

According to a further aspect, a system for limiting remote control between a portable electronic device and one or more vehicle systems in a vehicle is included. The system includes a remote passenger control application stored on the portable electronic device, the portable electronic device being operably connected for computer communication to the one or more vehicle systems. The system also includes a remote control module for sending one or more remote control commands from the portable electronic device to the one or more vehicle systems that are utilized to remotely control the one or more vehicle systems from the portable electronic device. The system further includes a vehicle system control module for determining that one or more countermeasure controls are associated with the one or more remote control commands. The vehicle system control module sends one or more commands to at least one of a parental control module, a step control module, a power restriction control module, and a remote disable control module in order to restrict the remote control module from sending the one or more remote control commands from the portable electronic device if it is determined that one or more countermeasure controls are imposed on the one or more remote control commands.

According to still another aspect, a computer readable medium including instructions that when executed by a processor execute method for limiting remote control between a portable electronic device and one or more vehicle systems in a vehicle is provided. The instructions include connecting the portable electronic device to the vehicle. The instructions also include sending one or more remote control commands from the portable electronic device to the one or more vehicle systems, the one or more remote control commands are executed for remotely controlling the one or more vehicle systems from the portable electronic device. Additionally, the instructions include determining one or more countermeasure controls associated with the one or more remote control commands. The instructions further include restricting the execution of one or more remote control commands from the portable electronic device if it determined that one or more countermeasure controls are associated with the one or more remote control commands.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
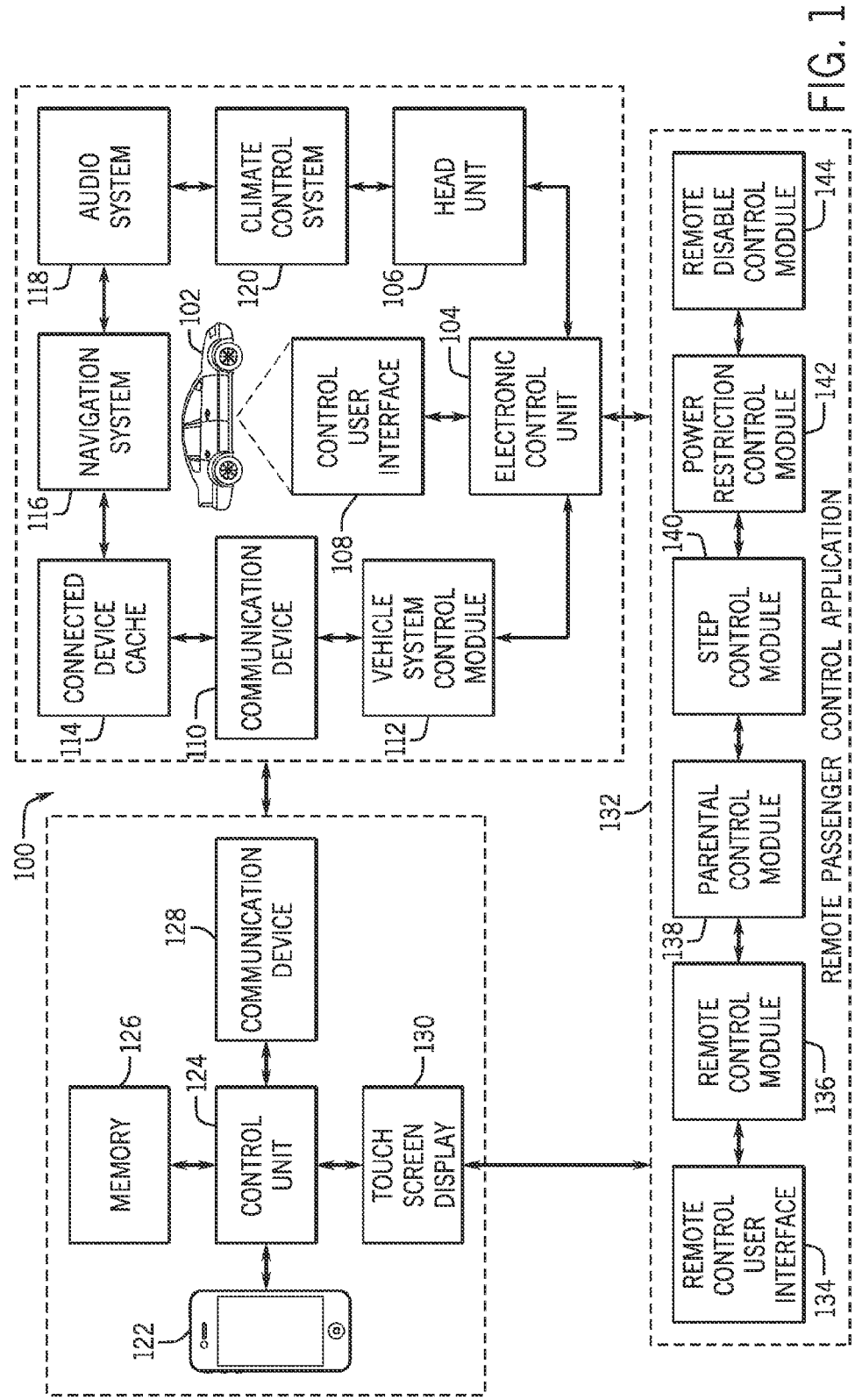
FIG. 1 is a schematic view of a system for limiting remote control between one or more portable electronic devices and one or more vehicle systems according to an exemplary embodiment.

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

An "operable connection," as used herein can include a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can or can not carry one or more human occupants. Further, the term "vehicle" can include vehicles that are automated or non-automated with predetermined paths or free-moving vehicles.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

An "output device" as used herein can include devices that can derive from vehicle components, systems, subsystems, and electronic devices. The term "output devices" includes, but is not limited to: display devices, and other devices for outputting information and functions.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, among others.

Referring now to the drawings, wherein the showings are for purposes of illustrating one or more exemplary embodiments and not for purposes of limiting the same. FIG. 1 is a schematic view of a system for limiting remote control between one or more portable electronic devices and one or more vehicle systems according to an exemplary embodiment. The system, which can also be referred to as a remote passenger control system, is generally designated by reference numeral 100. The components of the remote passenger control system 100, as well as the components of other systems, hardware architectures and software architectures discussed herein, can be combined, omitted or organized into different architecture for various embodiments. However, the exemplary embodiments discussed herein focus on the environment 100 as illustrated in FIG. 1, with corresponding system components, and related methods.

As shown in the illustrated embodiment of FIG. 1, the vehicle 102 generally includes an electronic control unit 104 that controls a plurality of vehicle systems 116, 118, 120. The vehicle systems include, but are not limited to a navigation system 116, an audio system 118, and a climate control system 120, among others (not shown). In one embodiment, the vehicle 102 can also include a video system (not shown), a telecommunications system (not shown), an infotainment system (not shown), a rear entertainment system, and the like. In one embodiment, the systems can include their own processor and memory that communicate with the electronic control unit 104 of the vehicle 102.

The vehicle systems 116, 118, 120 can include individual functions that correspond to the utilization of each of the vehicle systems 116, 118, 120. These functions can include the settings for each of the vehicle systems 116, 118, 120 that can be modified by the driver and/or one or more passengers in order to utilize the vehicle systems 116, 118, 120 in a preferred manner. For example, some functions of the audio system 118 can include volume, rewind, fast-forward, scan, seek, etc. Also, some functions of the climate control system 120 can include fan speed, temperature setting, among others.

The electronic control unit 104 includes internal processing memory, an interface circuit, and bus lines for transferring data, sending commands, and communicating with the vehicle systems 116, 118, 120. The electronic control unit 104 can include a microprocessor, field programmable gate array (FPGA), application-specific integrated circuit (ASIC), or other similar devices. The vehicle 102 also includes a communication device 110 for sending data internally in the vehicle 102 to the vehicle systems 116, 118, 120 and externally to one or more connected devices. The communication device 110 included within the vehicle 102 is also connected to the electronic control unit 104 and is capable of providing wired or wireless computer communications utilizing various protocols to be utilized to send/receive electronic signals internally to features and systems within the vehicle 102 and to external devices. Generally, these protocols include a wireless system (e.g., IEEE 802.11, IEEE 802.15.1 (Bluetooth®)), a near field communication system (NFC) (e.g., ISO 13157), a local area network (LAN), and/or a point-to-point system. Additionally, the communication device 110 is operably connected for internal computer communication via a bus (e.g., a Controller Area Network (CAN) or a Local Interconnect Network (LIN) protocol bus) to facilitate data input and output between the electronic control unit 104 and vehicle systems 116, 118, 120.

In one embodiment, the electronic control unit 104 is operably connected to a head unit 106 that includes a vehicle display (not shown). The head unit 106 can store one or more user interfaces corresponding to operating systems, applications that interact with the vehicle systems 116, 118, 120 and that can be utilized to adjust the operation of the vehicle systems 116, 118, 120. In one embodiment, the head unit 106 can include storage memory (not shown) that is utilized to store and execute the operating systems and/or applications in order to provide the one or more user interfaces to the occupants of the vehicle 102 via the vehicle display.

In an exemplary embodiment, the head unit 106 is controlled by the electronic control unit 104 in order to execute the operating systems and/or applications that interact with the vehicle systems 116, 118, 120. In another embodiment, the head unit 106 can include a separate controller (not shown) that can be any hardware device capable of executing instructions stored within the storage memory. However, in the embodiment shown in FIG. 1, the head unit 106 is controlled by the electronic control unit 104 to execute operating systems and/or applications that communicate with the vehicle systems 116, 118, 120 based on settings inputs provided to a control user interface 108.

In one embodiment, the control user interface 108 can include numerous user interfaces. The control user interface 108 can be utilized by the driver and/or one or more passengers to interact with and operate one or more vehicle systems 116, 118, 120 through the vehicle display. In one embodiment, the control user interface 108 can include a separate driver settings interface (not shown) that can only be accessed by the driver of the vehicle 102 in order to provide input settings of the vehicle 102 and the vehicle systems 116, 118, 120. As will be described in more detail below, the driver settings interface of the control user interface 108 can also be utilized to provide control countermeasures in order for the driver to limit remote control of the vehicle systems 116, 118, 120 by the one or more passengers through a remote passenger control application 132 that is executed on one or more portable electronic devices 122. The remote control countermeasures can be utilized by the driver in order to limit and/or prevent misuse by one or more passengers when remotely controlling one or more vehicle systems 116, 118, 120 through the remote passenger control application 132.

In an exemplary embodiment, the memory storage of the head unit 106 can store a vehicle system control module 112 that can be executed by the electronic control unit 104 of the vehicle 102. In one embodiment, the vehicle system control module 112 can be a component of the remote passenger control application 132 stored within the head unit 106 of the vehicle 102. In another embodiment, the vehicle system control module 112 can be stored on an external server that communicates with the vehicle systems 116, 118, 120 through the communication device 110. The vehicle system control module 112 can be utilized to communicate with the vehicle systems 116, 118, 120 in order to provide remote control of one or more of the vehicle systems 116, 118, 120 by one or more passengers utilizing the one or more of the portable electronic devices 122. As described in more detail below, the vehicle system control module 112 can also be utilized to determine one or more countermeasure controls that are associated to the execution of one or more remote control commands sent from the one or more portable electronic devices 122 (based on the passenger's remote control of the vehicle systems 116, 118, 120). The association of the one or more countermeasure controls can be utilized to restrict the one or more remote control commands from being sent from the one or more portable electronic devices 122 to the one or more vehicle systems 116, 118, 120. In an exemplary embodiment, the vehicle system control module 112 communicates with one or more components of the remote passenger control application 132 that are being executed on the one or more portable electronic devices 122 that are connected to the vehicle 102.

The remote passenger control application 132 provides the ability to one or more passengers to operate, change features, and/or utilize one or more of the vehicle systems 116, 118, 120. In other words, passengers can enable/disable the vehicle systems 116, 118, 120 and/or adjust the features of the vehicle systems 116, 118, 120 using the remote passenger control application 132 executed on the portable electronic device 122. This allows the passengers to remotely control the vehicle systems 116, 118, 120 without interaction with the control user interface 108 on the vehicle display.

Generally, the portable electronic device(s) 122 of the remote passenger control system 100 can be a computing device and can include a touch screen display 130, which enables user input (e.g., touch keyboard), and a control unit 124 for providing processing and computing functions. The one or more portable electronic devices 122 can include, but are not limited to, handheld devices, mobile devices, smart phones, laptops, tablets, wearable computing devices, optical head mounted displays, and e-readers. As shown in the exemplary embodiment of FIG. 1, the one or more portable electronic devices 122 include a communication device 128 that communicates directly with the communication device 110 of the vehicle 102. In general, the control unit 124 is operatively connected to the communication device 128, the memory 126, the touch screen display 130, a plurality of sensors (not shown), and optionally any other input device (e.g., hard buttons, switches, a keyboard, etc.).

The communication device 128 of the one or more portable electronic devices 122 can include antennas and components for wired and wireless computer connections and communications via various protocols. The communication device 128 is capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In particular, the communication device 128 can be utilized to provide web based applications and internet resources to one or more users (e.g., passengers) of the one or more portable electronic devices 122. In addition, the communication device 128 provides peer-to-peer (P2P) connections over to send/receive electronic signals with an external device to be utilized by software applications installed within the memory 126 of the one or more portable electronic devices 122. Accordingly, in the embodiment shown in FIG. 1, the communication device 128 of the one or more portable electronic devices 122 is utilized to provide P2P communications to send and receive electronic signals with the communication device 110 of the vehicle 102. In an exemplary embodiment, the electronic signals are sent to/from the vehicle system control module 112 of the head unit 106 in order to be utilized by the vehicle systems 116, 118, 120 to provide inputs supplied through the remote passenger control application 132 (that resides within the memory 126 of the one or more portable electronic devices 122).

In one embodiment, the one or more portable electronic devices 122 can connect to the vehicle 102 via a Bluetooth® connection that can be utilized to provide data connections to support telephonic communication, play music, and/or utilize applications residing within the memory 126 of the one or more portable electronic devices 122. Specifically, the one or more portable electronic devices 122 connect via Bluetooth® to the vehicle 102 and the remote passenger control application 132 connects to the vehicle systems 116, 118, 120 through the vehicle system control module 112 to provide bilateral communications (via the communication devices 110, 128). In another embodiment, an alternate type of wireless (e.g., Wi-Fi) connection or a wired (e.g., USB) connection can be utilized to connect the one or more portable electronic devices 122 to the vehicle 102 and can be utilized by the remote passenger control application 132 to communicate with the vehicle systems 116, 118, 120 (via the communication devices 110, 128).

In an exemplary embodiment, the head unit 106 can store a connected device cache 114 that is populated with data that corresponds to one or more portable electronic devices 122 that are connected to the vehicle 102. In this embodiment, the connected device cache 114 can include a database that includes a list of one or more device identifiers that can be queried based on inputs received on the control user interface 108. The one or more device identifiers can include the name of the owner of the one or more (connected) portable electronic devices 122, the device name (e.g., Bluetooth® nickname) (e.g., "Joe's Phone") of one or more (connected) portable electronic devices 122, and/or a user ID associated with a user credentials utilized to authenticate and launch the remote passenger control application 132 on the one or more (connected) portable electronic devices 122.

In an exemplary embodiment, the remote passenger control application 132 is a software application that is installed directly onto the memory 126 of the one or more portable electronic devices 122. In another embodiment, the remote passenger control application 132 and/or one or more of the components of the remote passenger control application 132 can be installed externally from the memory 126 of the one or more portable electronic devices 122. For example, the remote passenger control application 132 can include a web based application that is accessed by the communication device 128 of the one or more portable electronic devices 122. In other embodiments, the remote passenger control application 132 can include a cloud based application that resides on an external host server but is accessed through a viewer application that is installed on the memory 126 of the one or more portable electronic devices 122.

Although the embodiments discussed herein discuss the remote passenger control application 132 as an independent application, the remote passenger control application 132 can be integrated with and/or within other vehicle related software or web based applications that reside on or are accessed via the one or more portable electronic devices 122. In alternate embodiments, the remote passenger control application 132 can be used as a plug-in/add-on to software that is utilized during operation a web browser on the one or more portable electronic devices 122. As a plug-in/add-on, the remote passenger control application 132 can be automatically enabled when the web browser and/or another application is launched by one or more users, or enabled upon the detection of a communication link between the communication device 128 and communication device 110 (e.g., communication link via a Bluetooth® connection).

The remote passenger control application 132 provides the one or more passengers with the ability to remotely control one or more of the vehicle systems 116, 118, 120 through a remote control user interface 134 via the touch screen display 130 of the one or more portable electronic devices 122. The remote passenger control application 132 virtually extends the head unit 106 of the vehicle 102 to provide (remote) controls to interact with and utilize the vehicle systems 116, 118, 120 beyond controls provided at the head unit 106 of the vehicle 102. In other words, the remote passenger control application 132 can be utilized by one or more of the passengers to remotely enable or disable one or more of the vehicle systems 116, 118, 120 and/or adjust features of the vehicle systems 116, 118, 120 without requiring the one or more passengers to provide inputs to the control user interface 108 of the vehicle 102.

In an exemplary embodiment, the remote passenger control application 132 also provides countermeasure controls for the driver to utilize in order to prevent the one or more passengers from misusing the application 132. The countermeasure controls provided by the remote passenger control application 132 offer the driver the ability to control the connection between the one or more portable electronic devices 122 and the vehicle 102 and/or the vehicle systems 116, 118, 120. In addition, the countermeasure controls provided by the remote passenger control application 132 offer the driver the ability to limit the one or more passenger's ability to remotely control the one or more of the vehicle systems 116, 118, 120 and/or adjust functions of the one or more vehicle systems 116, 118, 120.

The remote passenger control application 132 includes various modules that are controlled and operated by the control unit 124 of the one or more portable electronic devices 122 (in addition to the vehicle system control module 112 that is controlled and operated by the electronic control unit 104). The remote passenger control application 132 can be launched by user input of an executable icon on the touch screen display 130. In one embodiment, the remote passenger control application 132 includes a user ID (i.e., user identification user name and password) that is entered by the user upon launching of the remote passenger control application 132. The user ID corresponds to the user that is utilizing the remote passenger control application 132. In an exemplary embodiment, upon launching of the remote passenger control application 132 the remote control user interface 134 is presented. The remote control user interface 134 can include one or more graphical user interfaces that specifically correspond to one or more vehicle systems 116, 118, 120 in order for one or more passengers to provide inputs to remotely control the one or more vehicle systems 116, 118, 120. For example, the remote control user interface 134 can include an audio remote control interface that can be utilized to enable, disable, and/or provide functional controls (e.g., increasing of the volume) to the audio system 118.

In an exemplary embodiment, the remote passenger control application 132 includes a remote control module 136 that is utilized to communicate one or more remote control commands to the vehicle system control module 112 (via the communication devices 128, 110) in order to remotely control the vehicle systems 116, 118, 120 based on the inputs received on the remote control user interface 134 by the one or more passengers. Specifically, upon receiving one or more remote control inputs through the remote control user interface 134 in order to remotely control one or more of the vehicle systems 116, 118, 120, the remote control module 136 sends (communicates) one or more remote control commands to the vehicle system control module 112 (via computer communication between the communication devices 128, 110).

The one or more remote control commands can include electronic signals that are utilized to execute the remote control of one or more vehicle systems 116, 118, 120, from the one or more portable electronic devices 122. In one embodiment, the one or more remote control commands can include one or more commands to remotely access the one or more vehicle systems 116, 118, 120, one or more commands to remotely enable and disable the one or more vehicle systems 116, 118, 120, and/or one or more commands to remotely adjust one or more functions of the one or more vehicle systems 116, 118, 120. In one embodiment, the one or more remote control commands can additionally include one or more device identifiers (that are derived from the connected device cache 114) corresponding to the one or more portable electronic devices 122 that are connected to the vehicle 102.

Upon receiving the remote control command, the vehicle system control module 112 can execute the remote control command (via the electronic control unit 104) on the one or more vehicle systems 116, 118, 120. For example, one of the passengers can utilize the remote passenger control application 132 to remotely control the navigation system 116 by providing a desired destination input in order for the navigation system 116 to provide turn by turn directions to the desired destination. Specifically, upon receiving the desired destination input on the remote control user interface 134, the remote control module 136 can send the remote control command (as a command to adjust the function of the navigation system 116 that includes the desired destination input) to the vehicle system control module 112. The vehicle system control module 112 can execute the remote control command by providing the destination input to the navigation system 116 in order for the navigation system 116 to accordingly provide turn by turn directions based on the passenger's desired destination input.

In an exemplary embodiment, the driver of the vehicle 102 can utilize the control user interface 108 (via the vehicle display on the head unit 106) to provide inputs to implement countermeasure controls that are associated to the one or more remote control commands sent from the remote control module 136 to the vehicle system control module 112. The countermeasure controls can be associated to the one or more remote control commands in order to limit remote control of the vehicle systems 116, 118, 120 by the one or more passengers utilizing the remote passenger control application 132. In one embodiment, as described in more detail below, the countermeasure controls include parental controls, step controls, power restriction controls, and remote disable controls. It is understood that other countermeasure controls for limiting remote control of the vehicle systems 116, 118, 120 from the remote passenger control application 132 can be implemented with the systems and methods discussed herein.

The countermeasure controls can be implemented by the driver through the control user interface 108 in order to limit passenger misuse when controlling the vehicle systems 116, 118, 120. In one embodiment, as described in more detail below, upon receiving one or more inputs from the driver to implement the countermeasure controls (via the control user interface 108), the vehicle system control module 112 analyzes the one or more inputs and communicates one or more countermeasure control commands to one of more countermeasure control modules 138-144 of the remote passenger control application 132 (via computer communication between the communication devices 110, 128). The countermeasure control modules 138-144 receive and interpret the one or more countermeasure commands in order to determine countermeasure controls that are associated with the execution of one or more remote control commands. Upon interpreting the one or more countermeasure controls the countermeasure control modules 138-144 create one or more corresponding restriction commands based on the association of the one or more countermeasure controls to the execution of one or more remote control commands that are sent to the remote control module 136 in order to restrict the execution of one or more remote control commands sent by the remote control module 136 to the vehicle system control module 112 (based off the one or more associated countermeasure controls).

In the exemplary embodiment of FIG. 1, the countermeasure control modules 138-144 include a parental control module 138, a step control module 140, a power restriction control module 142 and a remote disable control module 144. In one embodiment, the parental control module 138 is utilized to implement the parental controls. The parental controls are countermeasure controls that can be implemented by the driver (on the control user interface 108) in order to restrict one or more passengers from utilizing various aspects of the remote passenger control application 132. Specifically, the parental controls can be utilized to restrict the one or more passengers from accessing certain vehicle systems 116, 118, 120 through the remote control user interface 134. In addition, the parental controls can be utilized to restrict the one or more passengers from modifying functions of the vehicle systems 116, 118, 120. In an exemplary embodiment, the parental controls can be utilized to restrict all passengers within the vehicle from utilizing their respective portable electronic devices 122 to remotely control the vehicle systems 116, 118, 120 via the remote passenger control application 132. In an alternate embodiment, the parental controls can be utilized to restrict one or more specific passengers that are specifically identified by the driver from utilizing the one or more portable electronic devices 122 to remotely control the vehicle systems 116, 118, 120 via the remote passenger control application 132.

In an exemplary embodiment, a driver settings interface can be included as part of the control user interface 108. The driver settings interface can be utilized by the driver to activate and deactivate the parental controls via a corresponding input icon prior to driving the vehicle 102. In one embodiment, upon utilizing the control user interface 108 to activate the parental controls, the driver can be presented with a parental controls user interface (not shown) that allows the driver to set specific parental controls. In one embodiment, the parental controls user interface can present the driver with a vehicle systems list that includes a list of one or more vehicle systems 116, 118, 120 that are capable of being remotely controlled via the remote passenger control application 132. The parental controls user interface can additionally present the driver with a vehicle system functions list that includes a list of one or more functions of the one or more vehicle systems 116, 118, 120 that are capable of being remotely adjusted via the remote passenger control application.

In some embodiments, the parental controls user interface can also present the driver with a connected devices list that includes a list of one or more portable electronic devices 122 (that are connected to the vehicle 102) with one or more associated user identifiers that are derived from the connected device cache 114. In an exemplary embodiment, the parental controls user interface can also include input icons associated with the lists that allow the driver to place parental controls on one or more specific items presented on the vehicle systems list and the vehicle systems functions list. In an additional embodiment, the parental controls user interface can also include input icons that allow the driver to place parental controls on one or more specific portable electronic devices 122 presented on the connected device list in order to place parental controls on the ability of specific passengers to remotely control one or more vehicle systems 116, 118, 120. Upon selection of the parental controls by the driver via the parental controls user interface, the vehicle system control module 112 sends a parental control command to the parental control module 138.

The parental control module 138 receives and interprets the parental control command sent by the vehicle system control module 112 and sends a corresponding restriction command to the remote control module 138 to restrict the execution of the one or more remote control commands from the remote control module 138 in order to restrict the access to one or more vehicle systems 116, 118, 120, and restrict the adjustment of one or more functions of the vehicle systems 116, 118, 120. In an exemplary embodiment, the restriction command restricts remote control of one or more vehicle systems 116, 118, 120 from all of the portable electronic devices 122 that are connected to the vehicle 102.

In an additional embodiment, the restriction command sent by the parental control module 138 restricts remote control of the one or more vehicle systems 116, 118, 120 from one or more specific portable electronic devices 122 (as stated above) that are connected to the vehicle 102 and that correspond to one or more specific passengers (via the user identification. For example, the driver can input parental controls in order to restrict a child passenger from utilizing the remote passenger control application 132. Upon interpreting the parental control command sent by the vehicle system control module 112, the parental control module 138 can send a restriction command to the remote control module 136 to restrict the execution of one or more remote control commands from being sent to the vehicle system control module 112 in order to remotely control one or more vehicle systems 116, 118, 120. In other words, upon receipt of the restriction command, the remote control module 136 can restrict the remote passenger control application 132 specifically executed on the child passenger's portable electronic device 122 from being utilized to remotely access/control the one or more vehicle systems 116, 118, 120.

In an illustrative example, the driver can institute parental controls to restrict one or more passengers of the vehicle 102 from utilizing the remote passenger control application 132 to remotely control the audio system 118, in order to ensure that the audio system 118 can not be remotely controlled. Specifically, the parental control module 138 can send a restriction command to the remote control module 136 to restrict execution of one or more remote commands that are sent from the remote control module 136 to the vehicle system control module 112 in order to access the audio system 118 from one or more portable electronic devices 122 utilized by the passengers of the vehicle.

Referring again to the types of countermeasure controls, the step controls are countermeasure controls that can be implemented by the driver on the control user interface 108 in order to limit the range of remote adjustability of functions of vehicle systems 116, 118, 120. Specifically, the step controls are countermeasure controls that set a remote adjustability range restriction in order to limit a range of remote adjustability of the one or more functions of the one or more vehicle systems 116, 118, 120. In other words, the step controls can be utilized to restrict the one or more passengers from adjusting the range of functions outside of a specified range as set by the driver of the vehicle 102. For instance, the driver can institute a step control that limits a range for the volume function adjustability of the audio system 118 in order to ensure that one or more passengers can not remotely adjust the volume function of the audio system 118 above a specified level (e.g., above 50% of the maximum volume).

In an exemplary embodiment, the driver can utilize the driver settings interface of the control user interface 108 to activate and deactivate the step controls via a step controls input icon prior to driving the vehicle 102. In one embodiment, upon utilizing the control user interface 108 to activate the step controls, the driver can be presented with the parental controls user interface. In addition to allowing the driver to set specific parental controls, the parental controls user interface can also allow the driver to set specific step controls. In one embodiment, upon determining that the driver has input step controls input icon, step control settings can be presented on the vehicle systems functions list (discussed above) in order for the driver to set the step controls to the one or more functions of the one or more vehicle systems 116, 118, 120.

In one embodiment, upon selection of the step controls by the driver via the parental controls user interface, the vehicle system control module 112 sends a step control command to the step control module 140. The step control module 140 receives and interprets the step control command sent by the vehicle system control module 112 and sends a corresponding restriction command to the remote control module 136 to associate step controls to the remote control of specific functions of the vehicle systems 116, 118, 120 as inputted by the driver on the control user interface 108. For example, the driver can institute step controls to limit the specified range for the volume function of the audio system 118 to ensure that the volume function of the audio system cannot be remotely controlled by one or more passengers to exceed 50% of the maximum volume. Upon actuating the step controls, the step control module 140 can send the restriction command to the remote control module 136 in order to restrict the remote control command to adjust the volume function of the audio system 118 outside of the specified remote adjustability range restriction of 50% of the maximum volume.

In an exemplary embodiment, the step control module 140 can also communicate with the remote control user interface 134 in order to display a message to instruct the one or more passengers utilizing the remote passenger control application 132 that the step control has been instituted that restricts them from being able to remotely adjust a specific function outside of the remote adjustability range restriction. For example, based on the example above, if one or more passengers attempt to remotely adjust the volume function of the audio system 118 above 50% of the maximum volume, the remote control user interface 134 can display a message that states "You are attempting to change a function level outside of an allowable range. Therefore, please ask the driver to adjust the function level" that is presented to one or more passengers through the touch screen display 130.

Referring again to the types of countermeasure controls, the power restriction controls are countermeasure controls that can either be implemented by the driver on the control user interface 108 or automatically implemented in order to limit the ability of one or more passengers to remotely enable and disable one or more vehicle systems 116, 118, 120. The power restriction controls can be utilized in conjunction with the parental controls and the step controls to limit the passenger from not only connecting to and/or modifying vehicle systems 116, 118, 120 and functions of vehicle system 116, 118, 120, but also restricting the one or more passengers from enabling and/or disabling vehicle systems 116, 118, 120 based on the driver's preferences.

In an exemplary embodiment, the driver can utilize a power restriction controls interface (not shown) of the control user interface 108 to activate the power restriction controls. In one embodiment, the power restriction controls can automatically be enabled (i.e., by default) when the remote passenger control application 132 is utilized. In other words, the power restriction controls can be utilized without any input from the driver to ensure that the remote control user interface 134 does not include a power button that applies to a respective vehicle system 116, 118, 120, as chosen by the driver. The driver can optionally disable the power restriction via the power restriction user interface which can provide a power button to the respective vehicle system 116, 118, 120 on the remote control user interface 134. When the power restriction controls are automatically enabled, the vehicle system control module 112 sends a power restriction command to the power restriction control module 142 as soon as the remote passenger control application 132 is actuated. The power restriction control module 142 receives and interprets the power restriction control command sent from the vehicle system control module 112 and sends a restriction command to the remote control module 136 in order to restrict the execution of the remote control command sent by the remote control module 136 for enabling and disabling one or more vehicle systems 116, 118, 120. Therefore, the remote control module 136 will not present the power button that applies to the respective vehicle system 116, 118, 120 as chosen by the driver.

In another embodiment, the power restriction controls interface can include power restriction input icons that are associated to the vehicle systems list (that is also displayed on the parental control user interface, discussed above). For example, the driver can be presented with a power restriction input icon that is associated to the audio system 118. Upon the driver inputting the power restriction icon associated to the audio system 118, the power restriction control is enabled for the audio system 118. Upon the selection of the power restriction controls by the driver via the power restriction controls user interface, the vehicle system control module 112 sends a power restriction command to the power restriction control module 142. The power restriction control module 142 receives and interprets the power restriction control command sent from the vehicle system control module 112 and sends a restriction command to the remote control module 136 in order to restrict the execution of the remote control command sent by the remote control module 136 for enabling and disabling one or more vehicle systems 116, 118, 120. For example, the driver can institute the power restriction controls on the audio system 118. Therefore, one or more passengers that are utilizing one or more portable electronic devices 122 can no longer enable or disable (power ON or OFF) the audio system 118 from the remote control user interface 134 of the remote passenger control application 132. In other words, only the main power button of the audio system that can reside physically on the head unit 106 or virtually on the control user interface 108 can be utilized to enable or disable the audio system 118.

Referring again to the types of countermeasure controls, in an exemplary embodiment the remote disable controls are countermeasure controls that can be implemented by the driver on the control user interface 108 in order to disable use (e.g., execution) of the remote passenger control application 132 to remotely connect to any of the vehicle systems 116, 118, 120. In other words, upon the driver inputting a remote disable input button presented on the control user interface 108, one or more portable electronic devices 122 that are being utilized to remotely control the vehicle systems 116, 118, 120 (in any capacity) will no longer be able to execute the remote passenger control application 132 in order to connect to the vehicle 102 to remotely control the one or more vehicle systems 116, 118, 120. Therefore, in this embodiment, the remote disable controls ensure that any and all of the portable electronic devices 122 that are executing the remote passenger control application 132 are forced to disable (e.g., end any tasks related to the execution of) the application 132. For example, upon the driver inputting the remote disable input button, the remote passenger control application 132 may be disabled and/or exited on one or more portable electronic devices 122 connected to the vehicle 102. In another embodiment, the remote disable controls do not disable the remote passenger control application 132, but does limit the user's ability to use the remote control user interface 134 and/or cease the remote control module's 136 ability to communicate remote control commands to the vehicle system control module 112.

In an alternate embodiment, the remote disable control module 144 can be implemented by the driver to completely disconnect one or more portable electronic devices 122 that are connected to the vehicle 102. In other words, upon the driver inputting the remote disable input button presented on the control user interface 108, one or more portable electronic devices 122 that are being utilized to remotely control the vehicle systems 116, 118, 120 (in any capacity) will disconnect from the vehicle 102 and will no longer be utilized to remotely control the one or more vehicle systems 116, 118, 120. Therefore, in this embodiment, the remote disable controls ensure that any and all of the portable electronic devices 122 connected to the vehicle 102 are completely disconnected from the vehicle 102 upon the driver inputting the remote disable input button on the control user interface 108.

In one embodiment, the remote disable input button can always be presented (before and during driving the vehicle 102) to the driver on the control user interface 108. In another embodiment, the remote disable input button is presented on a separate remote disable user interface (not shown) included as part of the control user interface 108. In an exemplary embodiment, once the driver inputs the remote disable input button, the vehicle system control module 112 sends a remote disable command to the remote disable control module 144 and to the electronic control unit 104 of the vehicle 102. Upon receiving the remote disable command, the remote disable control module 144 interprets the remote disable command and sends a restriction command to the remote control module 136 to disable the remote passenger control application 132 on one or more portable electronic devices 122 connected to the vehicle 102. In other words, the remote control module 136 reactively restricts the execution of all remote control commands from the remote control module 136 of the application 132. In some embodiments, upon receiving the remote disable command, the electronic control unit 104 sends a disconnection command to the communication device 110 of the vehicle 102 to disconnect the one or more portable electronic devices 122 that are connected to the vehicle 102. Upon receiving the disconnection command from the electronic control unit 103, the communication device 110 of the vehicle 102 disconnects all connections to the communication device(s) 128 of the one or more portable electronic devices 122. In one embodiment, upon reception of the remote disable command from the vehicle system control module 112, the electronic control unit 104 clears the connected device cache 114 of the one or more device identifiers corresponding to the one or more portable electronic devices 122 that were connected to the vehicle 102.

In one embodiment, upon inputting the remote disable input button the driver can be presented with a remote enable input button on the control user interface 108. In one embodiment, the remote enable input button is a user interface input button that is presented with an accompanying message that replaces the remote disable input button on the control user interface 108 (once the driver inputs the remote disable input button). In another embodiment, the remote enable input button is presented as the remote disable input button (in a different color/format) that is presented with an accompanying message once the driver inputs the remote disable input button.

In an alternate embodiment, upon determining that the driver inputs the remote disable input, the vehicle system control module 112 initiates a countdown based on a predetermined grace period in which the driver can input the remote enable input button in order to re-enable the remote passenger control application 132 on the one or more portable electronic devices 122 connected to the vehicle 102. An accompanying message associated with the remote enable input button can be shown to the driver on the control user interface 108 via the vehicle display that instructs the driver of the predetermined grace period (e.g., thirty seconds) wherein the remote enable input button can be inputted by the driver. The accompanying message can be accompanied by a count down timer that presents the count down of the predetermined grace period as presented by the vehicle system control module 112. In one or more embodiments, the predetermined grace period is set to thirty seconds as a default grace period. However, in some embodiments, the predetermined grace period can modified by the driver on the control user interface 108 prior to driving the vehicle 102 and prior to the utilization of the remote disable input button.

In an exemplary embodiment, if the driver chooses to input the remote enable input button within the predetermined grace period, the one or more portable electronic devices 122 re-executes the remote passenger control application 132 that was disabled by the implementation of the remote disable controls. In other words, the one or more passengers utilizing the one or more portable electronic devices 122 can once again use the remote passenger control application 132 to remotely control the vehicle systems 116, 118, 120, barring any other countermeasure controls (e.g., parental controls, step controls) that are applied by the driver. In another embodiment, if the driver chooses to input the remote enable input button within the predetermined grace period the one or more portable electronic devices that were disconnected by the implementation of the remote disable controls (upon the driver inputting the remote disable input button) are reconnected to the vehicle 102.

Upon utilizing the remote enable input button to reverse the remote disable controls within the predetermined grace period, the vehicle system control module 112 sends a remote enable command to the remote disable control module 144 and the electronic control unit 104. The remote disable control module 144 can interpret the remote enable command and send an enable command to the remote control module 136 to initiate the execution and/or enablement of the remote passenger control application 132 on the one or more portable electronic devices 122. The remote control module 136 can reactively enable the execution of all remote control commands (that are not restricted by other countermeasure controls) from the one or more portable electronic devices 122.

In the embodiment discussed above, when one or more portable electronic devices 122 are disconnected from the vehicle 102 upon the driver inputting the remote disable input button, the electronic control unit 104 sends a command to the communication device 110 of the vehicle 102 to reconnect the one or more portable electronic devices 122 upon receiving the remote enable command from the vehicle system control module 112. The communication device 110 of the vehicle 102 reestablishes all connections to the communication device(s) 128 of the one or more portable electronic devices 122 that were disconnected to the vehicle 102 by the implementation of the remote disable controls. In other words, upon utilizing the remote enable input button to reconnect the one or more portable electronic devices that were disconnected by the remote disable controls, the one or more portable electronic devices 122 are all simultaneously reconnected to the vehicle 102, thereby re-adding the device identifiers of the one or more portable electronic devices 122 to the connected device cache 114.

In an exemplary embodiment, if the driver does not choose to input the remote enable input button within the predetermined grace period, the remote passenger control application 132 remains disabled on the one or more portable electronic devices 122. In addition, the remote enable input button will no longer be presented to the driver on the control user interface 108. In the additional embodiment discussed above, with respect to one or more portable electronic devices 122 that are disconnected from the vehicle 102 upon the driver inputting the remote disable input button, the one or more portable electronic devices remain disconnected from the vehicle 102, (and removed from the connected driver cache 114) by the implementation of the remote disable controls.

Figure 2:
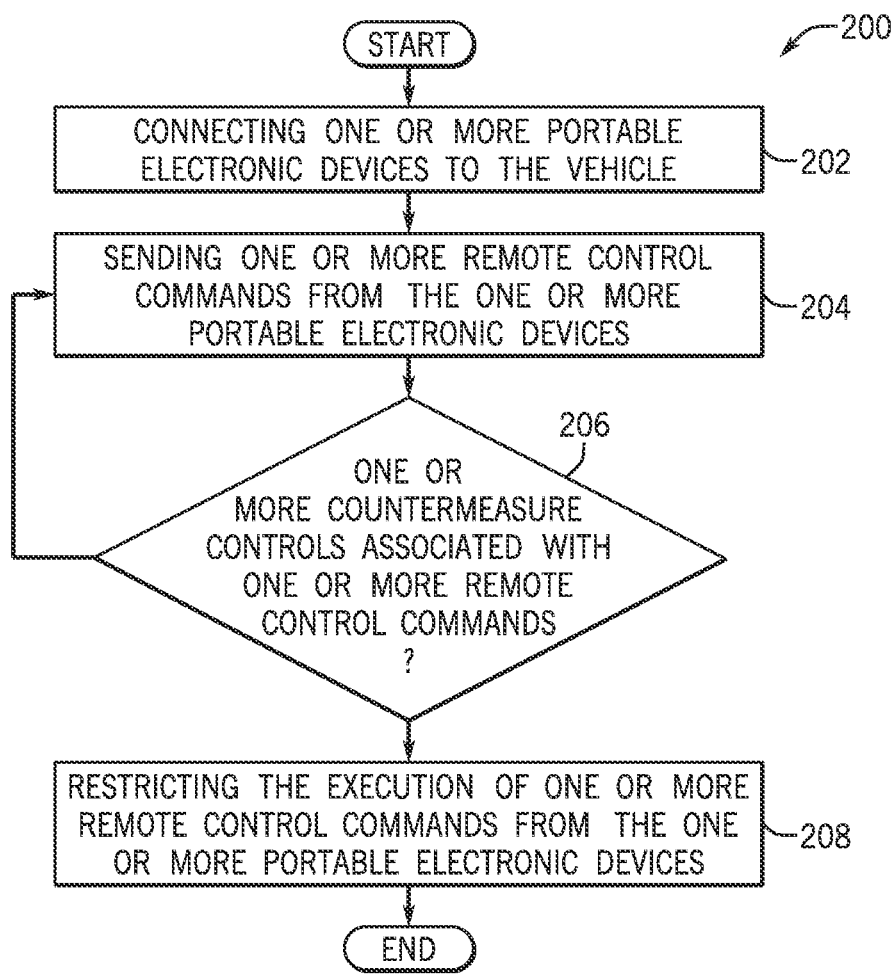
FIG. 2 is a process flow diagram of an exemplary method utilized by an exemplary embodiment of a remote passenger control application for limiting remote control between one or more portable electronic devices and one or more vehicle systems according to an exemplary embodiment.

Referring now to FIG. 2, an exemplary method 200 utilized by an exemplary embodiment of the remote passenger control application 132 for limiting remote control between one or more portable electronic devices and one or more vehicle systems from the system 100 of FIG. 1, according to an exemplary embodiment is shown. At step 202, the method includes connecting one or more portable electronic devices 122 to the vehicle 102. As described above, the one or more portable electronic devices 122 can be connected to the vehicle 102 via various types of wired or wireless computer communication between the communication device 110 of the vehicle 102 and the communication device(s) 128 of one or more portable electronic devices 122.

At step 204, the method includes sending one or more remote control commands from the one or more portable electronic devices. In one embodiment, the remote passenger control application 132 can be initialized by the one or more passengers utilizing the one or more portable electronic devices 122 connected to the vehicle 102 (at step 202) in order to remotely control one or more vehicle systems 116, 118, 120. As discussed above, the one or more passengers can utilize the remote control user interface 134 to provide inputs to remotely control one or more vehicle systems 116, 118, 120 and adjust functions of the one or more vehicle systems 116, 118, 120. Upon receiving inputs on the remote control user interface 134, the remote control module 136 of the remote passenger control application 132 can send one or more remote control commands to the vehicle system control module 112 in order to remotely control the one or more vehicle systems 116, 118, 120.

At step 206, the method includes determining one or more countermeasure controls associated with one or more remote control commands. Specifically, the vehicle system control module 112 determines if any inputs have been received on the control user interface 108 that correspond to the one or more countermeasure controls as described in more detail with reference to FIGS. 3 and 4. If it is determined that one or more countermeasure controls associated with the one or more remote control commands occurs (at step 206), at step 208, the method includes restricting the execution of one or more remote control commands from the one or more portable electronic devices 122. In one embodiment, upon receiving one or more inputs from the driver to implement the countermeasure controls (via the control user interface 108), the vehicle system control module 112 analyzes the one or more inputs and communicates one or more countermeasure control commands to one of the four countermeasure control modules 138-144 of the remote passenger control application 132 (via computer communication between the communication devices 110, 128). As described in more detail with reference to FIGS. 3 and 4, the countermeasure control modules 138-144 receive and interpret the one or more countermeasure commands in order to determine countermeasure controls that are associated with the one or more remote control commands. Upon interpreting the one or more countermeasure controls the countermeasure control modules 138-144 create one or more corresponding restriction commands that are sent to the remote control module 136 in order to restrict the execution of one or more remote control commands sent by the remote control module 136 to the vehicle system control module 112 (based off the one or more associated countermeasure controls).

Figure 3A:
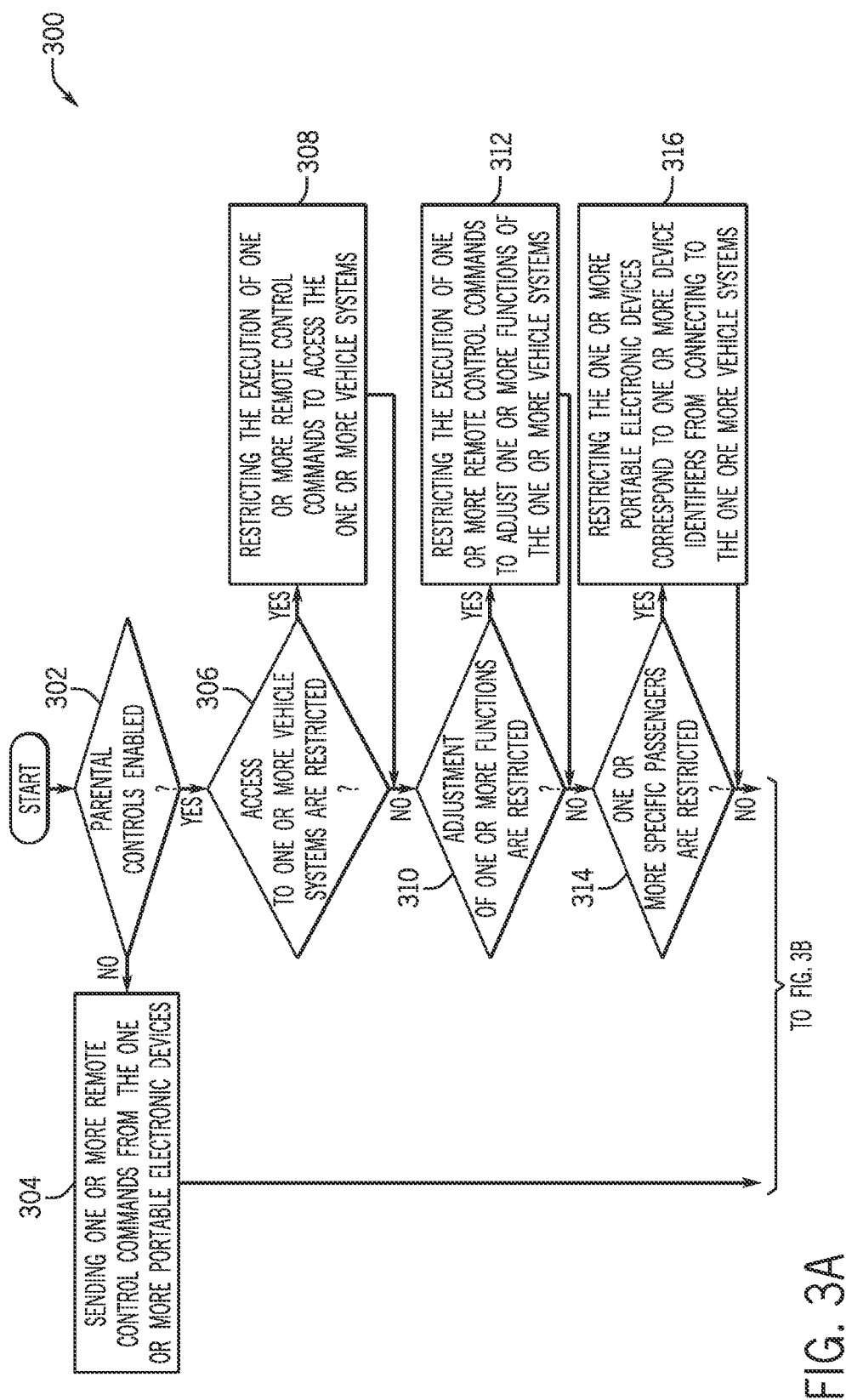
FIG. 3A is a process flow diagram of an exemplary method utilized by an exemplary embodiment of the remote passenger control application for determining and implementing parental controls, for limiting remote control from one or more portable electronic devices to one or more vehicle systems according to an exemplary embodiment.
Figure 3B:
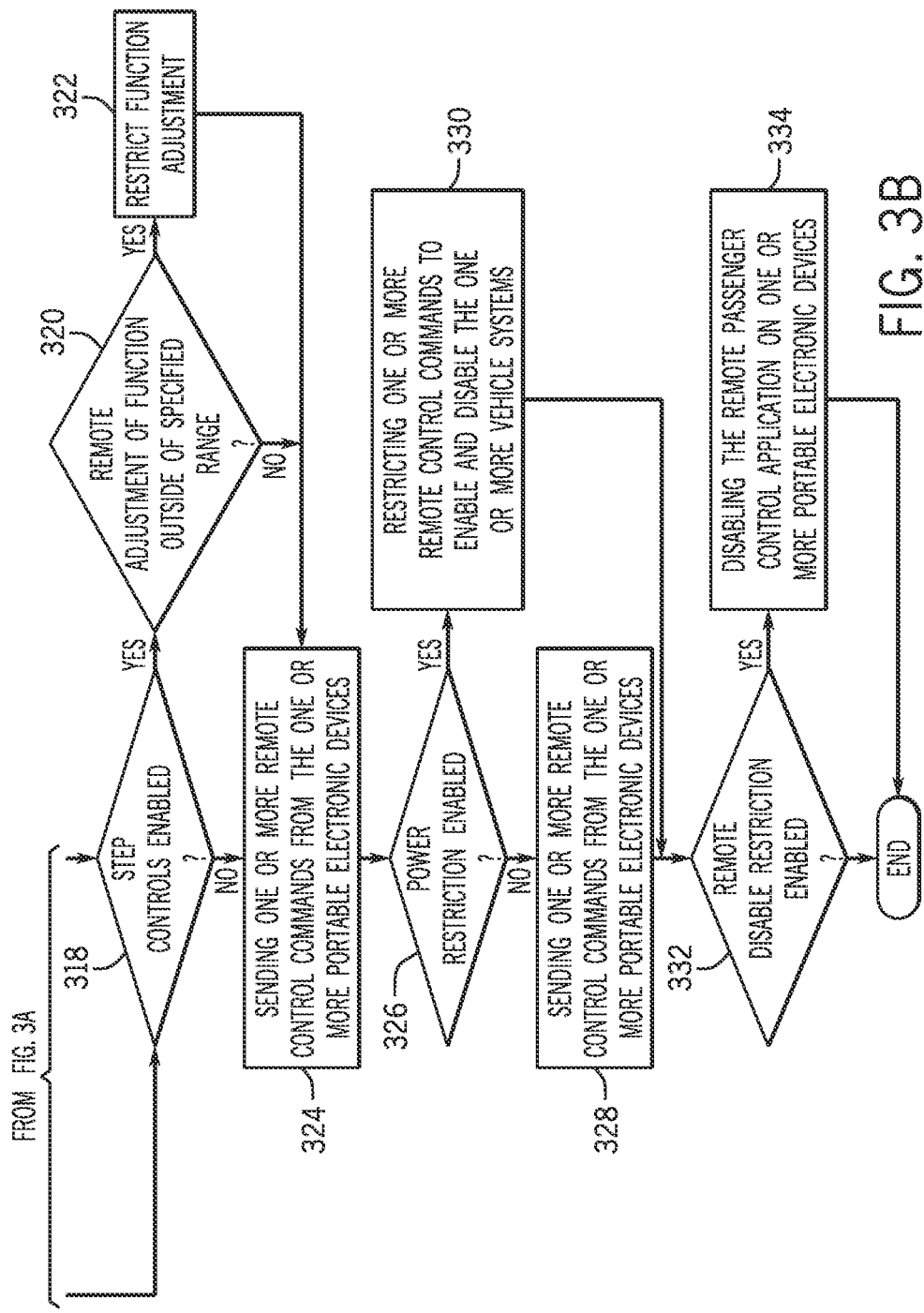
FIG. 3B is a process flow diagram of an exemplary method utilized by an exemplary embodiment of the remote passenger control application for determining and implementing step controls, power restriction controls, and/or for limiting remote control from one or more portable electronic devices to one or more vehicle systems according to an exemplary embodiment.

Referring now to FIG. 3A, an exemplary method 300 utilized by an exemplary embodiment of the remote passenger control application 132 for determining and implementing parental controls, for limiting remote control from one or more portable electronic devices 122 to one or more vehicle systems 116, 118, 120 from the operating environment of FIG. 1 according to an exemplary embodiment is shown. In the method of FIGS. 3A and 3B (discussed below), a specific order of determining and implementing countermeasure controls is shown in an order of parental controls, step controls, power restriction controls, and remote disable restriction controls, however, it is understood that the method and systems described herein can determine and implement the countermeasure controls simultaneously or in any selective order.

At step 302, the method includes determining if parental controls are enabled. Specifically, it is determined if the driver has utilized the control user interface 108 to enable parental controls and the vehicle system control module 112 has sent a parental control command to the parental control module 138 to enable one or more parental controls. If it is determined that the parental controls are not enabled (at step 302), the method includes at step 304, sending one or more remote control commands from the one or more portable electronic devices 122. Therefore, one or more passengers can utilize the remote control user interface 134 to remotely control the one or more vehicle systems 116, 118, 120, barring any step controls that are determined to be enabled at step 318 (FIG. 3B), any power restriction controls that are determined to be enabled at step 326, and/or remote disable controls that are determined to be enabled at step 322 (FIG. 3B) as described in more detail below.

If it is determined that the parental controls are enabled (at step 302), at step 306, the method includes determining if access to one or more vehicle systems 116, 118, 120 are restricted. Specifically, it is determined if the driver has utilized the parental control user interface of the control user interface 108 to enable parental controls to restrict one or more passengers from accessing the restricted vehicle systems 116, 118, 120 through the remote control user interface 134. If it is determined that the one or more vehicle systems 116, 118, 120 are restricted (at step 306), at step 308, the method includes restricting the execution of the one or more remote control commands to access the one or more vehicle systems 116, 118, 120. Specifically, as described above, the parental control module 138 interprets the parental control command sent by the vehicle system control module 112 and sends a restriction command to the remote control module 136 to restrict the execution of the remote control command to remotely access one or more vehicle systems 116, 118, 120 from the remote control user interface 134 of the remote passenger control application 132.

At step 310, it is determined if one or more functions of one of more vehicle systems are restricted. Specifically, it is determined if the driver has utilized the parental control user interface of the control user interface 108 to enable parental controls to restrict the one or more passengers from modifying functions of one or more vehicle systems 116, 118, 120. If it is determined that the one or more vehicle functions of one or more vehicle systems 116, 118, 120 are restricted (at step 310), at step 312, the method includes restricting the execution of one or more remote control commands to adjust one or more functions of the one or more vehicle systems 116, 118, 120. Specifically, the parental control module 138 interprets the parental control command sent by the vehicle system control module 112 and sends a restriction command to the remote control module 136 to restrict execution of the remote control command to remotely adjust one or more functions of the one or more systems 116, 118, 120 from the remote control user interface 134 of the remote passenger control application 132.

At step 314, it is determined if one or more specific passengers are restricted. As described above, in one embodiment, the parental controls can be utilized by the driver of the vehicle 102 to restrict one or more specific passengers that are specifically identified by the driver from utilizing the one or more portable electronic devices 122 to remotely control the vehicle systems 116, 118, 120 via the remote passenger control application 132. Therefore, it is determined if the driver has utilized the parental control user interface of the control user interface 108 to enable parental controls to restrict one or more portable electronic devices 122 associated to one or more device identifiers (derived from the connected device cache 114) that are utilized by one or more specific passengers. If it is determined that one or more specific passengers are restricted (at step 314), at step 316, the method includes restricting the one or more portable electronic devices corresponding to the one or more device identifiers from connecting to the one or more vehicle systems 116, 118, 120. Specifically, the parental control module 138 interprets the parental control command sent by the vehicle system control module 112 and sends a restriction command to the remote control module 136 to restrict remote control access from the one or more portable electronic devices 122 that correspond to the one or more device identifiers that are restricted by the driver in order to restrict remote control of the vehicle systems 116, 118, 120 from the remote control user interface 134.

Referring now to FIG. 3B, an exemplary method 300 utilized by an exemplary embodiment of the remote passenger control application 132 for determining and implementing step controls, power restriction controls, and/or remote disable restriction controls, for limiting remote control from one or more portable electronic devices 122 to one or more vehicle systems 116, 118, 120 from the operating environment of FIG. 1 according to an exemplary embodiment is shown.

At step 318, it is determined if step controls are enabled. Specifically, it is determined if the driver has utilized the control user interface 108 to enable step controls and the vehicle system control module 112 has sent a step control command to the step control module 140 to enable one or more step controls on one or more functions of the one or more vehicle systems 116, 118, 120. If it is determined that one or more step controls are not enabled (at step 314), at step 324 the method includes sending one or more remote control commands from the one or more portable electronic devices 122.

At step 320, it is determined if a remote function adjustment of the one or more vehicle systems 116, 118, 120 is outside of a remote adjustability range. Specifically, it is determined if one or more passengers utilized the remote passenger control application 132 to remotely adjust the one or more functions of the one or more vehicle systems outside of the remote adjustability range set by the driver of the vehicle 102. If it is determined that the remote function adjustment is outside of a specified range (at step 320), at step 322, the step control module 140 restricts the function adjustment. Specifically, the step control module 140 interprets the step control command sent by the vehicle system control module 112 and sends a restriction command to the remote control module 136 to restrict access to remotely adjust one or more restricted functions of the one or more systems 116, 118, 120 outside of the adjustability range from the remote control user interface 134 of the remote passenger control application 132. If it is determined that the remote function adjustment is inside of a specified range (at step 320), at step 324, the method includes sending one or more remote control commands from the one or more portable electronic devices 122.

As described above, in one embodiment, the power restriction controls are automatically enabled and one or more remote control commands are automatically restricted to enable and disable the one or more vehicle systems 116, 118, 120 by default when the remote passenger control application 132 is utilized. Also as described above, in an alternate embodiment the driver can utilize the control user interface 108 to enable the power restriction controls. At step 326 of the exemplary method 300, it is determined if the driver has utilized the control user interface 108 to enable the power restriction controls and the vehicle system control module 112 has sent the power restriction control command to the power restriction control module 142. If it is determined that the power restriction controls are not enabled (at step 326), at step 328 the method includes sending one or more remote control commands from the one or more portable electronic devices 122. Specifically, one or more passengers can utilize the remote control user interface 134 to remotely enable and disable one or more vehicle systems 208, barring any parental controls that are determined to restrict access to one or more vehicle systems 116, 118, 120 at step 306, as described above.

If it is determined that the power restriction controls are enabled (at step 326), at step 330, the method includes restricting of one or more remote control commands to enable and disable the one or more vehicle systems 116, 118, 120. Specifically, the power restriction controls are placed on the enabling and disabling of one or more specific vehicle systems 116, 118, 120 as inputted by the driver on the control user interface 108. As described above, the power restriction control module 142 interprets the power restriction control command sent by the vehicle system control module 112 and sends a restriction command to the remote control module 136 to restrict remote enabling and disabling of one or more vehicle systems 116, 118, 120 (as inputted by the driver) by one or more passengers utilizing the remote passenger control application 132.

At step 332, it is determined if remote disable restriction controls are enabled. Specifically, it is determined if the driver has inputted the remote disable input button on the control user interface 108 to disable the execution of the remote passenger control application 132 on one or portable electronic devices 120. If it is determined that the remote disable restriction controls are enabled (at block 332), at block 334, the method includes disabling the remote passenger control application 132 on one or more portable electronic devices 120. In one embodiment, the remote disable controls ensure that any and all of the portable electronic devices 122 that are executing the remote passenger control application 132 are forced to disable (e.g., end any tasks related to the execution of) the application 132.

Figure 4:
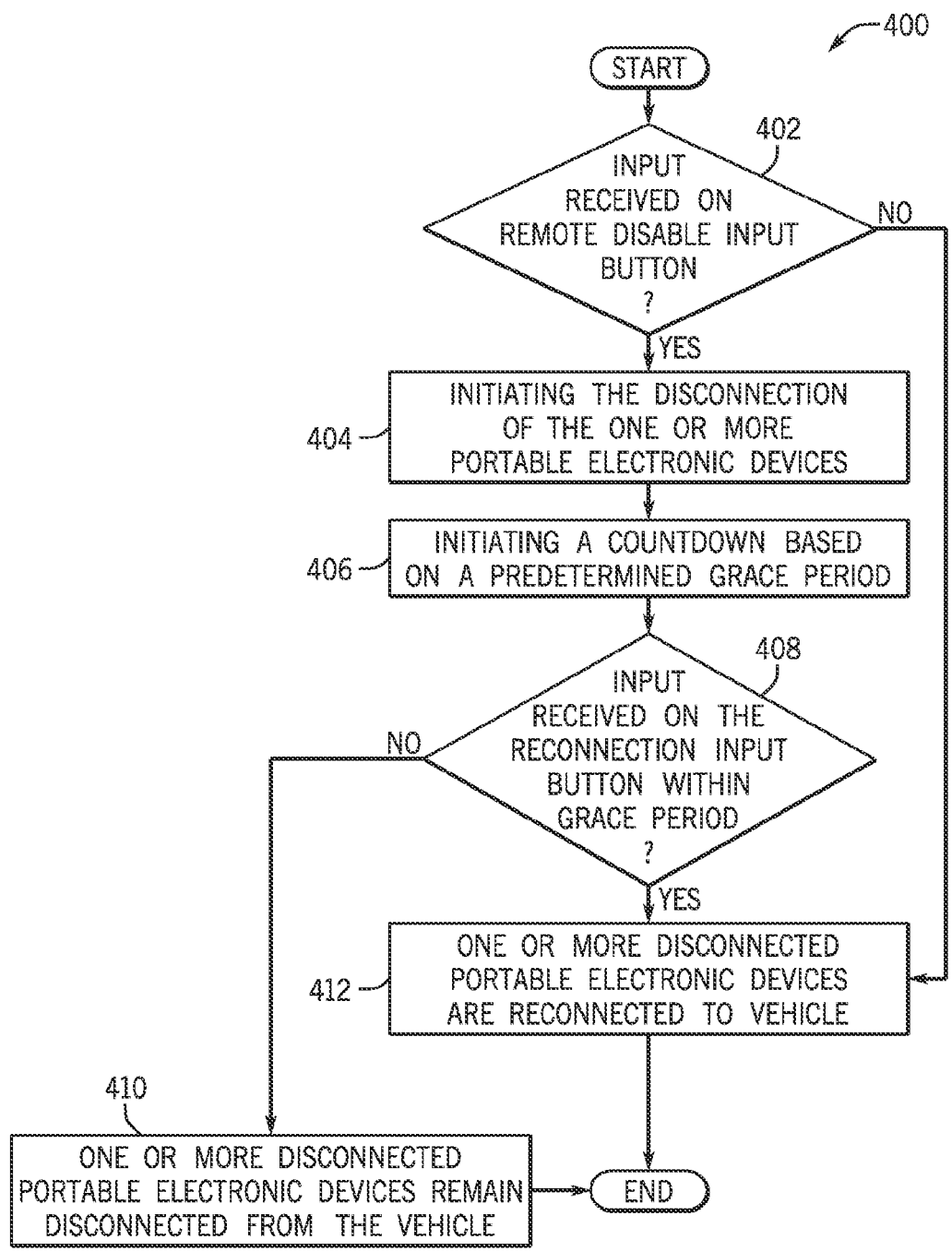
FIG. 4 is a process flow diagram of an exemplary method utilized by an exemplary embodiment of the remote passenger control application for implementing remote disable controls for disconnecting one or more portable electronic devices from the vehicle according to an exemplary embodiment.

Referring now to FIG. 4, an exemplary method 400 utilized by an exemplary embodiment of the remote passenger control application 132 for implementing remote disable controls for disconnecting one or more portable electronic devices 122 from the vehicle 102 from the operating environment of FIG. 1 according to an exemplary embodiment is shown. At step 402, it is determined if an input is received on the remote disable input button. As described above, the driver is presented with the remote disable input button on the control user interface 108. Specifically, it is determined if the driver has inputted the remote disable input button to enable the remote disable control. In one embodiment, it is determined if the vehicle system control module 112 has sent a remote disable control command to the remote disable control module 144 to enable the remote disable controls in order to disconnect one or more portable electronic devices 122 from the vehicle 102.

At step 404, the method includes initiating the disconnection of the one or more portable electronic devices 122. Specifically, once it is determined that an input is received on the remote disable input button, the vehicle system control module 112 sends a remote disable command to the remote disable control module 144 and to the electronic control unit 104 of the vehicle 102. Upon receiving the remote disable command, the remote disable control module 144 interprets the remote disable command and sends a restriction command to the remote control module 136 to disable the remote passenger control application 132. In addition, upon receiving the remote disable command, the electronic control unit 104 sends a disconnection command to the communication device 110 of the vehicle 102 to disconnect the one or more portable electronic devices 122 from the vehicle 102.

At step 406, the method includes initiating a countdown based on a predetermined grace period. In one embodiment, upon the disconnection of the one or more portable electronic devices 122 from the vehicle 102, the vehicle system control module 112 initiates a countdown timer corresponding to the predetermined grace period. The remote enable input button is also presented to the driver on the control user interface 108. At step 408, it is determined if an input is received on the remote enable input button within the predetermined grace period. In one embodiment, the countdown timer is displayed to the driver on the control user interface 108 and continues to countdown the remaining time until the predetermined grace period ends. If it is determined that an input is not received on the remote enable input button within the grace period (at step 408), at step 410, the one or more disconnected portable electronic devices 122 remain disconnected from the vehicle 102.

If it is determined that the input is received on the remote enable input button within the grace period (at step 408), at step 412, the one or more disconnected portable electronic devices 122 are reconnected to the vehicle 102. In one embodiment, upon the driver inputting the remote enable input button (within the predetermined grace period) on the control user interface 108, the vehicle system control module sends a remote enabling command to the remote disable control module 144 and the electronic control unit 104. Upon receipt of the remote enabling command by the remote disable control module 144, the remote disable control module 144 sends a command to the remote control module 136 in order to re-enable the remote passenger control application 132. Additionally, the electronic control unit 104 sends a command to the communication device 110 of the vehicle 102 to reconnect the one or more disconnected portable electronic devices 122 to the vehicle 102. Upon receiving the command, the communication device 100 reestablishes the connection to the communication device(s) 128 of the one or more portable electronic devices 122 that were previously disconnected from the vehicle 102 based on the implementation of the remote disable controls. Therefore, passenger can utilize the remote passenger control application 132 to remotely control one or more vehicle systems 116, 118, 120, barring the implementation of the other countermeasure controls.

As discussed, various embodiments of the remote passenger control system 100 can be utilized. Also, various embodiments of the remote passenger control system 100 can be utilized to send various types of data (e.g., media, files, playlists, etc.) to numerous vehicle systems 116, 118, 120. In addition, numerous components and technologies that have not been discussed herein can be utilized to compute operations associated with the remote passenger control application 132 and to provide remote control inputs to the vehicle systems 116, 118, 120. It is to be appreciated that in addition of one or more portable electronic devices 122, the remote passenger control application 132 can be utilized on and/or with different types of devices that are in production and that are not yet in production.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A method for limiting remote control between a portable electronic device and one or more vehicle systems in a vehicle, comprising:
    connecting the portable electronic device to the vehicle;
    sending one or more remote control commands from the portable electronic device to the one or more vehicle systems, wherein the one or more remote control commands are executed for remotely controlling the one or more vehicle systems from the portable electronic device;
    determining one or more countermeasure controls associated with the one or more remote control commands; and
    restricting execution of the one or more remote control commands from the portable electronic device being utilized by at least one non-driving passenger of the vehicle if it is determined that the one or more countermeasure controls are associated with the one or more remote control commands, wherein restricting the execution of the one or more remote control commands includes receiving an input of a remote disable input button presented on a control user interface of the vehicle and disabling the execution of a remote passenger control application on the portable electronic device based on a corresponding selection of one of the one or more countermeasure controls, wherein a countdown is initiated based on a predetermined grace period upon receiving the input on the remote disable input button and initiating enablement of the remote passenger control application on the portable electronic device upon receiving a remote enable input before the countdown has been fully completed.

2. The method of claim 1, wherein the one or more countermeasure controls includes one or more parental controls, wherein the one or more parental controls restricts the execution of the one or more remote control commands by at least one of: restricting the one or more remote control commands to access the one or more vehicle systems, restricting the one or more remote control commands to adjust one or more functions of the one or more vehicle systems, restricting one or more portable electronic devices from connecting to the one or more vehicle systems.

3. The method of claim 1, wherein the one or more countermeasure controls includes one or more step controls that include a remote adjustability range restriction to limit a range of remote adjustability of the one or more vehicle systems.

4. The method of claim 3, wherein the one or more step controls restricts the one or more remote control commands from being communicated to the vehicle and the one or more vehicle systems to remotely adjust one or more functions of the one or more vehicle systems when it is determined that the remote function adjustment of the one or more vehicle systems is outside of the remote adjustability range restriction.

5. The method of claim 1, wherein the one or more countermeasure controls includes one or more power restriction controls, wherein the one or more power restriction controls restricts the remote control command by at least one of: restricting the one or more remote control commands to enable the one or more vehicle systems and restricting the one or more remote control commands to disable the one or more vehicle systems, wherein the one or more power restriction controls includes no longer displaying a power input button on a user interface presented on the portable electronic device.

6. The method of claim 1, wherein the one or more countermeasure controls includes one or more remote disable controls that initiate disconnection of one or more portable electronic devices that are connected to the one or more vehicle systems, wherein a remote disable control is initiated upon receiving the input of the remote disable input button.

7. The method of claim 6, further including reconnecting the portable electronic device to the one or more vehicle systems upon receiving the remote enable input before the countdown has been fully completed.

8. A system for limiting remote control between a portable electronic device and one or more vehicle systems in a vehicle comprising:
  a remote passenger control application stored on the portable electronic device, the portable electronic device being operably connected for computer communication to the vehicle;
  a remote control module for sending one or more remote control commands from the portable electronic device to the one or more vehicle systems that are utilized to remotely control the one or more vehicle systems from the portable electronic device; and
  a vehicle system control module for determining that one or more countermeasure controls are associated with the one or more remote control commands;
  wherein the vehicle system control module sends one or more commands to at least one of a parental control module, a step control module, a power restriction control module, and a remote disable control module in order to restrict the remote control module from executing the one or more remote control commands from the portable electronic device being utilized by at least one non-driving passenger of the vehicle if it is determined that the one or more countermeasure controls are imposed on the one or more remote control commands, wherein restricting execution of the one or more remote control commands includes receiving an input of a remote disable input button presented on a control user interface of the vehicle and disabling the execution of the remote passenger control application on the portable electronic device based on a corresponding selection of one of the one or more countermeasure controls, wherein a countdown is initiated based on a predetermined grace period upon receiving the input on the remote disable input button and initiating enablement of the remote passenger control application on the portable electronic device upon receiving a remote enable input before the countdown has been completed.

9. The system of claim 8, wherein the parental control module receives a parental control command from the vehicle system control module and sends a corresponding restriction command to the remote control module to restrict the remote control command by at least one of: restricting the one or more remote control commands to access the one or more vehicle systems, restricting the one or more remote control commands to adjust one or more functions of the one or more vehicle systems, restricting the one or more portable electronic devices from connecting to the one or more vehicle systems.

10. The system of claim 8, wherein the vehicle system control module sets one or more step controls that include a remote adjustability range restriction to limit a range of remote adjustability of the one or more vehicle systems.

11. The system of claim 10, wherein the vehicle system control module restricts the one or more remote control commands from being communicated to the vehicle and the one or more vehicle system to remotely adjust one or functions of the one or more vehicle systems when it is determined that the remote function adjustment of the one or more vehicle systems is outside of the remote adjustability range restriction.

12. The system of claim 8, wherein the power restriction control module receives a power restriction control command from the vehicle system control module and sends a corresponding restriction command to the remote control module to restrict the remote control command by at least one of: restricting the one or more remote control commands to enable the one or more vehicle systems and restricting the one or more remote control commands to disable the one or more vehicle systems, wherein the one or more power restriction controls includes no longer displaying a power input button on a user interface presented on the portable electronic device.

13. The system of claim 8, wherein the remote disable control module receives a remote disable control command from the vehicle system control module and sends a restriction command to the remote control module to initiate disconnection of one or more portable electronic devices that are connected to the one or more vehicle systems, wherein a remote disable control is initiated upon receiving the input of the remote disable input button.

14. The system of claim 13, wherein the vehicle system control module initiates reconnection of the portable electronic device to the one or more vehicle systems upon receiving the remote enable input before the countdown has been fully completed.

15. A non-transitory computer-readable storage medium storing instructions that when executed by a processor perform actions, comprising:
  connecting a portable electronic device to a vehicle;
  sending one or more remote control commands from the portable electronic device to one or more vehicle systems, wherein the one or more remote control commands are executed for remotely controlling the one or more vehicle systems from the portable electronic device;
  determining one or more countermeasure controls associated with the one or more remote control commands; and
  restricting execution of the one or more remote control commands from the portable electronic device being utilized by at least one non-driving passenger of the vehicle if it determined that the one or more countermeasure controls are associated with the one or more remote control commands, wherein restricting the execution of the one or more remote control commands includes receiving an input of a remote disable input button presented on a control user interface of the vehicle and disabling the execution of a remote passenger control application on the portable electronic device based on a corresponding selection of one of the one or more countermeasure controls, wherein a countdown is initiated based on a predetermined grace period upon receiving the input on the remote disable input button and initiating enablement of the remote passenger control application on the portable electronic device upon receiving a remote enable input before the countdown has been fully completed.

16. The non-transitory computer-readable medium of claim 15, wherein the one or more countermeasure controls includes one or more parental controls, wherein the one or more parental controls restricts the execution of the one or more remote control commands by at least one of: restricting the one or more remote control commands to access the one or more vehicle systems, restricting the one or more remote control commands to adjust one or more functions of the one or more vehicle systems, restricting one or more portable electronic devices from connecting to the one or more vehicle systems.

17. The non-transitory computer-readable medium of claim 15, wherein the one or more countermeasure controls includes one or more step controls that include a remote adjustability range restriction to limit a range of remote adjustability of the one or more vehicle systems.

18. The non-transitory computer-readable medium of claim 15, wherein the one or more countermeasure controls includes one or more power restriction controls, wherein the one or more power restriction controls restricts the remote control command by at least one of: restricting the one or more remote control commands to enable the one or more vehicle systems and restricting the one or more remote control commands to disable the one or more vehicle systems, wherein the one or more power restriction controls includes no longer displaying a power input button on a user interface presented on the portable electronic device.

19. The non-transitory computer-readable medium of claim 15, wherein the one or more countermeasure controls includes one or more remote disable controls that initiate disconnection of one or more portable electronic devices that are connected to the one or more vehicle systems, wherein a remote disable control is initiated upon receiving the input of the remote disable input button.

20. The non-transitory computer-readable medium of claim 19, further including reconnecting the portable electronic device to the one or more vehicle systems upon receiving the remote enable input before the countdown has been fully completed.

* * * * *